US010641387B2

(12) United States Patent
Morise

(10) Patent No.: US 10,641,387 B2
(45) Date of Patent: May 5, 2020

(54) VEHICLE SHIFT-BY-WIRE DEVICE

(71) Applicant: TOYOTA JIDOSHA KABUSHIKI KAISHA, Toyota-shi, Aichi (JP)

(72) Inventor: Masaru Morise, Nukata-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/199,033

(22) Filed: Nov. 23, 2018

(65) Prior Publication Data
US 2019/0162301 A1 May 30, 2019

(30) Foreign Application Priority Data

Nov. 24, 2017 (JP) .................................. 2017-226319

(51) Int. Cl.
F16H 61/12 (2010.01)
F16H 59/10 (2006.01)
(Continued)

(52) U.S. Cl.
CPC ............. F16H 61/12 (2013.01); F16H 59/10 (2013.01); F16H 59/105 (2013.01); F16H 61/24 (2013.01);
(Continued)

(58) Field of Classification Search
CPC ........ F16H 59/10; F16H 59/105; F16H 61/12; F16H 61/24; F16H 63/42
See application file for complete search history.

(56) References Cited

U.S. PATENT DOCUMENTS 5,309,744 A * 5/1994 Kito .................. B60R 25/02144
192/219.6
6,443,026 B1 * 9/2002 Arakawa ................ B60K 20/06
192/220.2
(Continued)

FOREIGN PATENT DOCUMENTS

JP 2007-331562 A 12/2007
JP 2017-057963 A 3/2017
JP 2017-125513 A 7/2017

Primary Examiner — Edwin A Young
(74) Attorney, Agent, or Firm — Oliff PLC

(57) ABSTRACT

A vehicle shift-by-wire device includes: a casing in which the shift actuator is disposed; a coupling member; and a connecting/disconnecting member disposed in the casing movably in the shifting direction and movably in a connecting/disconnecting direction crossing the shifting direction, and moved in the shifting direction integrally with the coupling member, wherein when the connecting/disconnecting member is held at an electrically shifting position in the connecting/disconnecting direction, the connecting/disconnecting member is coupled to the shift actuator and is moved in the shifting direction by the shift actuator to switch the shift corresponding position of the shift position switching mechanism via the coupling member, and wherein when the connecting/disconnecting member is moved to a manually shifting position in the connecting/disconnecting direction, the connecting/disconnecting member coupled to the shift actuator is disconnected so that the shift actuator is disabled to switch the shift corresponding position of the shift position switching mechanism.

7 Claims, 7 Drawing Sheets

(51) Int. Cl.
*F16H 61/24* (2006.01)
*F16H 63/42* (2006.01)

(52) U.S. Cl.
CPC ....... *F16H 63/42* (2013.01); *F16H 2061/122* (2013.01); *F16H 2061/1268* (2013.01); *F16H 2061/247* (2013.01); *F16H 2063/423* (2013.01)

(56) References Cited

U.S. PATENT DOCUMENTS

| | | | |
|---|---|---|---|
| 6,487,883 B2 * | 12/2002 | Suzuki | B60R 25/02144 477/99 |
| 8,401,747 B2 * | 3/2013 | Ito | F16H 61/12 701/51 |
| 2006/0163025 A1 * | 7/2006 | Hori | F16H 61/24 192/219.5 |

* cited by examiner

VEHICLE SHIFT-BY-WIRE DEVICE

This application claims priority from Japanese Patent Application No. 2017-226319 filed on Nov. 24, 2017, the disclosure of which is herein incorporated by reference in its entirety.

BACKGROUND OF THE INVENTION

Field of the Invention

The present invention relates to a vehicle shift-by-wire (SBW) device and, more particularly, to a technique enabling manual switching of a shift position of an automatic transmission at the time of failure.

Description of the Related Art

A known vehicle shift-by-wire device has an automatic transmission, a shift position switching mechanism configured to switch a shift position of the automatic transmission in accordance with multiple shift corresponding positions of the shift position switching mechanism and a shift actuator configured to electrically drive the shift position switching mechanism. The device described in Patent Document 1 is an example thereof and has an electric motor used as the shift actuator to drive the shift position switching mechanism for switching. In Patent Document 1, a seal member is removed at the time of failure so that a rotation shaft of the electric motor can manually be rotated from the outside of a housing to switch the shift position.

CITATION LIST

Patent Document 1: Japanese Laid-Open Patent Publication No. 2017-125513

SUMMARY OF THE INVENTION

Technical Problem

However, even if the shift position is manually switched in such a conventional vehicle shift-by-wire device, the switching operation of the shift position switching mechanism by the shift actuator is restarted when the shift-by-wire device recovers from a failure state, and the rotation shaft may rotate, so that the automatic transmission is switched to an unintended shift position.

The present invention was conceived in view of the situations and it is therefore an object of the present invention to prevent a shift actuator from performing unintended switching at the time of recovery from a failure state after a shift position switching mechanism is unable to be switched by the shift actuator and the shift position is switched manually operated for switching.

Problem to Solution

To achieve the above object, a first aspect of the present invention provides a vehicle shift-by-wire device including an automatic transmission, a shift position switching mechanism configured to switch a shift position of the automatic transmission in accordance with a plurality of shift corresponding positions of the shift position switching mechanism and a shift actuator configured to electrically drive the shift position switching mechanism, the vehicle shift-by-wire device further comprising: (a) a casing in which the shift actuator is disposed; (b) a coupling member mechanically coupled to the shift position switching mechanism via an interlocking device and moved in a shifting direction to switch the shift corresponding position of the shift position switching mechanism; and (c) a connecting/disconnecting member disposed in the casing movably in the shifting direction and movably in a connecting/disconnecting direction crossing the shifting direction, and moved in the shifting direction integrally with the coupling member, wherein when the connecting/disconnecting member is held at an electrically shifting position in the connecting/disconnecting direction, the connecting/disconnecting member is coupled to the shift actuator and is moved in the shifting direction by the shift actuator to switch the shift corresponding position of the shift position switching mechanism via the coupling member, and wherein when the connecting/disconnecting member is moved to a manually shifting position in the connecting/disconnecting direction, the connecting/disconnecting member coupled to the shift actuator is disconnected so that the shift actuator is disabled to switch the shift corresponding position of the shift position switching mechanism.

A second aspect of the present invention provides the vehicle shift-by-wire device recited in the first aspect of the invention, further comprising (a) a shift operation member disposed in the casing movably in the shifting direction, when the connecting/disconnecting member is moved to the manually shifting position, the shift operation member is coupled to the connecting/disconnecting member and manually operated to move to one of a plurality of predetermined shift selecting positions so that the connecting/disconnecting member is moved in the shifting direction and the shift corresponding position of the shift position switching mechanism is switched via the coupling member, and (b) a movement restriction mechanism disposed in at least one of the shift operation member and the connecting/disconnecting member and allowing the connecting/disconnecting member of which the position in the shifting direction is defined in accordance with the shift corresponding position via the coupling member to be operated to move in the manually shifting direction and to couple the shift operation member only when the shift selecting position of the shift operation member coincides with the shift corresponding position of the shift position switching mechanism.

A third aspect of the present invention provides the vehicle shift-by-wire device recited in the second aspect of the invention, wherein the movement restriction mechanism includes an engagement concave portion and an engagement convex portion disposed in one and the other of the shift operation member and the connecting/disconnecting member and allowed to fit to each other in the connecting/disconnecting direction and to be engaged relatively immovably in the shifting direction when the shift selecting position of the shift operation member coincides with the shift corresponding position of the shift position switching mechanism.

A fourth aspect of the present invention provides the vehicle shift-by-wire device recited in the second or third aspect of the invention, further comprising a selected position indicator indicating shift selecting positions and disposed in at least one of the casing and the shift operation member, and a detent mechanism positioning the shift operation member at each of the plurality of shift selecting positions.

A fifth aspect of the present invention provides the vehicle shift-by-wire device recited in any one of the first to fourth aspects of the invention, further comprising (a) a connecting/disconnecting operation member disposed in the casing immovably in the shifting direction and movably in the connecting/disconnecting direction and configured to engage with the connecting/disconnecting member relatively immovably in the connecting/disconnecting direction to operate the connecting/disconnecting member manually to move in the connecting/disconnecting direction, and (b) an electrical connector device disposed across the connecting/disconnecting operation member and the casing, and the electrical connector device being configured to mechanically connect and disconnect an electrical connection cable such that the electrical connector device is put into a connected state to enable the shift actuator to operate when the connecting/disconnecting operation member is operated to move such that the connecting/disconnecting member is moved to the electrically shifting position and such that the electrical connector device is put into a disconnected state to make the shift actuator unable to operate when the connecting/disconnecting operation member is operated to move such that the connecting/disconnecting member is moved to the manually shifting position.

A sixth aspect of the present invention provides the vehicle shift-by-wire device recited in any one of the first to fifth aspects of the invention, comprising a momentary type shift position selecting device configured to be operated by the driver to alternatively select one of a plurality of shift positions of the automatic transmission and configured to return automatically to an original state after a selecting operation of the shift position is performed.

A seventh aspect of the present invention provides the vehicle shift-by-wire device recited in any one of the first to sixth aspects of the invention, wherein the connecting/disconnecting device is configured to move pivotally around a shift center line that is the shifting direction and the connecting/disconnecting device is coupled relatively non-pivotally to an output member of the shift actuator disposed on the shift center line when the connecting/disconnecting device is operated to move to the electrically shifting position in the shift center line direction, and the connecting/disconnecting device coupled to the output member is disconnected from the output member when the connecting/disconnecting device is operated to move to the manually shifting position in the center line direction.

In the aspects of the invention, being immovable, relatively immovable, or relatively non-pivotable allow to include certain play within a range not causing a functional trouble.

Advantageous Effects of Invention

In the vehicle shift-by-wire device as described above, the shift corresponding position of the shift position switching mechanism can be switched by the shift actuator while the connecting/disconnecting member is held at the electrically shifting position, and when the connecting/disconnecting member is moved to the manually shifting position, the coupling with the connecting/disconnecting member to the shift actuator is disconnected, and the shift corresponding position of the shift position switching mechanism cannot be switched by the shift actuator. Therefore, at the time of failure when the switching by the shift actuator cannot be performed, the shift corresponding position of the shift position switching mechanism can manually be switched by moving the connecting/disconnecting member in the shifting direction through the movement operation to the manually shifting position. In this case, since the coupling between the shift actuator and the connecting/disconnecting member is disconnected at the manually shifting position, even if the shift actuator resumes operation in the case of natural recovery from the failure state, the connecting/disconnecting member does not move in the shifting direction so that the shift position switching mechanism is prevented from switching to the unintended shift corresponding position.

The second aspect of the invention corresponds to the case that the shift operation member coupled to the connecting/disconnecting member is included to switch the shift corresponding position of the shift position switching mechanism by using the shift operation member, the vehicle shift-by-wire device is provided with the movement restriction mechanism allowing the connecting/disconnecting member to be operated to move to the manually shifting position and coupled to the shift operation member only when the shift selecting position of the shift operation member coincides with the shift corresponding position of the shift position switching mechanism. Therefore, at the manually shifting position, the shift operation member can be operated to move to a desired shift selecting position to appropriately switch the shift position switching mechanism to the shift corresponding position corresponding to the shift selecting position.

When the shift selecting position of the shift operation member does not coincide with the shift corresponding position of the shift position switching mechanism, and the shift corresponding position of the shift position switching mechanism is unknown, the shift selecting position coinciding with the shift corresponding position of the shift position switching mechanism can be obtained by moving and operating the shift operation member in the shifting direction to move the connecting/disconnecting member toward the manually shifting position while changing the shift selecting position, so that the connecting/disconnecting member can be moved to the manually shifting position and coupled to the shift operation member. If the connecting/disconnecting member can be moved in the shifting direction without using the shift operation member, the connecting/disconnecting member can be moved toward the manually shifting position and coupled to the shift operation member while moving the connecting/disconnecting member in the shifting direction to switch the shift corresponding position of the shift position switching mechanism.

In the third aspect of the invention, since the movement restriction mechanism is made up of the engagement convex portion disposed in the connecting/disconnecting member and the engagement concave portion disposed in the shift operation member, if the shift selecting position of the shift operation member does not coincide with the shift corresponding position of the shift position switching mechanism, the engagement convex portion and the engagement concave portion cannot be fitted to each other, and therefore, the movement of the connecting/disconnecting member is prevented so that the coupling of the connecting/disconnecting member to the shift operation member is reliably prevented. When the engagement convex portion and the engagement concave portion are fitted to each other, the shift operation member and the connecting/disconnecting member are coupled via the engagement convex portion and the engagement concave portion relatively non-pivotally in the shifting direction, and therefore, the connecting/disconnecting member can be pivoted via the engagement convex portion and the engagement concave portion together with the shift operation member in the shifting direction, so that the device is easily and inexpensively manufactured.

In the fourth aspect of the invention, since the vehicle shift-by-wire device has the detent mechanism positioning the shift operation member at each of the multiple shift selecting positions and is provided with the selected position indicator indicating selected one of the multiple shift position select positions, the shift corresponding position of the shift position switching mechanism can easily and appropriately be switched by using the shift operation member while the driver (operator) confirms the shift selecting position with the selected position indicator.

The fifth aspect of the invention corresponds to the case of including the connecting/disconnecting operation member disposed in the casing immovably in the shifting direction and movably in the connecting/disconnecting direction and engaged with the connecting/disconnecting member relatively immovably in the connecting/disconnecting direction along with the electrical connector device disposed across the connecting/disconnecting operation member and the casing, and while the connecting/disconnecting member is held at the electrically shifting position by the connecting/disconnecting operation member, the electrical connector device is placed into connected state to enable operation of the shift actuator, so that the shift corresponding position of the shift position switching mechanism can be switched via the connecting/disconnecting member, the coupling member, etc. by the shift actuator. On the other hand, when the connecting/disconnecting member is moved to the manually shifting position by the connecting/disconnecting operation member at the time of failure, the electrical connector device is disconnected so that the shift actuator becomes inoperable, and therefore, even after recovery from the failure state, the shift actuator is maintained in an operation stop state to more reliably prevent the connecting/disconnecting member etc. from moving unintentionally.

In the sixth aspect of the invention, since the momentary type shift position selecting device automatically returns to the home position after the selection operation of the shift position is used, the selected shift position at the time of occurrence of failure is not identified from the shift position selecting device, and if the shift position is different from the shift corresponding position selected by manually moving the connecting/disconnecting member in the shifting direction at the time of failure, the shift actuator may perform switching to the unintended shift corresponding position (the selected shift position at the time of occurrence of failure) at the time of recovery from the failure. In this regard, since the connecting/disconnecting member is detached from the shift actuator in the present invention, the connecting/disconnecting member is not moved in the shifting direction even after recovery from the failure, and the shift corresponding position selected by the manual operation of the connecting/disconnecting member is maintained even if the shift corresponding position is different from the selected shift position at the time of occurrence of failure.

The seventh aspect of the invention corresponds to the case that the shifting direction is the pivot direction around the shift center line while the connecting/disconnecting direction is the center line direction of the shift center line, and, for example, a member having a columnar shape, a cylindrical shape, etc. disposed concentrically with the shift center line can be used as the connecting/disconnecting member, so that the connecting/disconnecting operation and the shift operation can easily be performed, and a switching device between the electrically shifting and the manually shifting mainly made up of the connecting/disconnecting member can easily and inexpensively be obtained.

DESCRIPTION OF THE PREFERRED EMBODIMENTS

Figure 1:
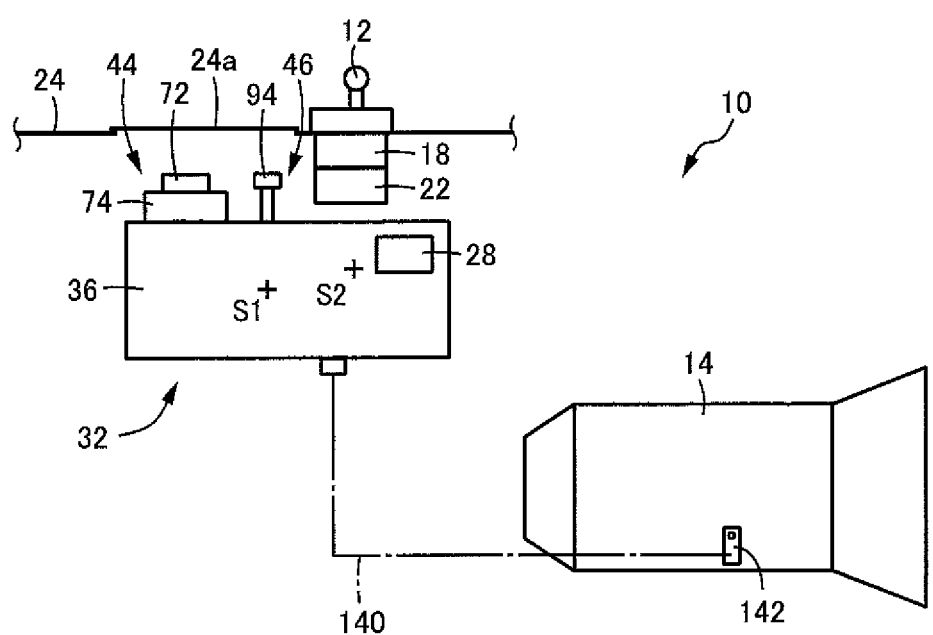
FIG. 1 is a schematic configuration diagram of a vehicle shift-by-wire device according to an example of the present invention.

A vehicle shift-by-wire device of the present invention electrically switches a shift position of an automatic transmission by a shift actuator to establish a shift position selected by a shift position selecting device such as a shift lever, for example, and the shift positions include a D position for allowing forward running, an R position for allowing reverse running, an N position for interrupting power transmission, a P position for interrupting power transmission and mechanically stopping rotation of an output shaft, etc. The shift positions may include only some of these shift positions, or further include other shift positions such as a B position for activating a power source brake. Regarding a vehicle, the vehicle shift-by-wire device may be applied to various vehicles such as an engine-driven vehicle in which power is generated by combustion of fuel, an electric vehicle driven by an electric motor, or a hybrid vehicle including multiple power sources.

The automatic transmission includes, for example, a multi-speed transmission of a planetary gear type, a parallel two axes type, etc. capable of forming multiple forward and reverse gear speeds and neutral state, a forward/reverse switching device capable of switching between forward running/reverse running and neutral state, a continuously variable transmission such as a belt type, an electrically controlled continuously variable transmission including a differential mechanism and a generator, etc., that is, the vehicle shift-by-wire device may be applied to various automatic transmissions capable of establishing multiple shift positions. For the shift actuator, for example, an actuator having a combination of an electric motor and a speed reducer (such as a cycloidal speed reducer and a worm gear) is suitably used; however, various actuators capable of being rotationally driven can be employed, or a linearly-moved actuator can also be used.

When a push-pull cable is used as an interlocking device, this makes arrangement easier, and therefore, an electric/manual switching device including the shift actuator, a coupling member, a connecting/disconnecting member, and a casing having the shift actuator and the members arranged therein can be located at an arbitrary position away from the automatic transmission in consideration of workability etc., which makes it easier to manually perform a switching operation for a shift corresponding position using the connecting/disconnecting member. A link mechanism, a gear mechanism, a chain, etc. can also be used as the interlocking device. The coupling member is fixed to the connecting/disconnecting member and integrally moved in a shifting direction and a connecting/disconnecting direction, for example, or may be locked to the connecting/disconnecting member relatively immovably in the shifting direction and relatively movably in the connecting/disconnecting direction. For example, with respect to the coupling member disposed in the casing movably in the shifting direction and immovably in the connecting/disconnecting direction, the connecting/disconnecting member may be engaged with the coupling member relatively movably in the connecting/disconnecting direction.

The connecting/disconnecting member is made up of, for example, a member having a columnar shape, a cylindrical shape, etc. disposed movably pivotally in a pivot direction around a shift center line, i.e., the shifting direction, and movably in a center line direction of the shift center line, i.e., the connecting/disconnecting direction, concentrically with the shift center line; however, the pivot direction around the shift center line and the center line direction of the shift center line can be defined as the connecting/disconnecting direction and the shifting direction, respectively. The connecting/disconnecting member having a shape other than a columnar shape and a cylindrical shape may be employed, and the shifting direction and the connecting/disconnecting direction may be orthogonal two axis directions, for example, and various other forms are available.

The connecting/disconnecting member is engaged relatively immovably in the connecting/disconnecting direction with, for example, a connecting/disconnecting operation member disposed in the casing immovably in the shifting direction and movably in the connecting/disconnecting direction and is configured to be manually operated to move in the connecting/disconnecting direction using the connecting/disconnecting operation member; however, without providing such a connecting/disconnecting operation member, the connecting/disconnecting member may directly be gripped by the hand etc. and can be operated to move in the connecting/disconnecting direction. If the connecting/disconnecting operation member is provided, for example, an electrical connector device can be disposed across the connecting/disconnecting operation member and the casing, such that when the connecting/disconnecting operation member is operated to move the connecting/disconnecting member to an electrically shifting position, a connected state is mechanically achieved to make the shift actuator operable and that when the connecting/disconnecting operation member is operated to move the connecting/disconnecting member to a manually shifting position, a disconnected state is mechanically achieved to make the shift actuator inoperable. The electrical connector device can have various forms to make the shift actuator unable to operate such as interrupting an input of a control signal to the shift actuator and interrupting a power supply to the shift actuator, for example. Even if such an electrical connector device is omitted and the operation of the shift actuator is resumed upon recovery from failure, the coupling between the connecting/disconnecting member and the shift actuator is disconnected, so that the connecting/disconnecting member etc. are prevented from unintentionally starting to move.

When the connecting/disconnecting member is operated to move to the manually shifting position, the connecting/disconnecting member is engaged relatively immovably in the shifting direction with, for example, a shift operation member disposed in the casing movably in the shifting direction and immovably in the connecting/disconnecting direction and is configured to be manually operated to move in the shifting direction by using the shift operation member; however, without providing such a shift operation member, the connecting/disconnecting member may directly be gripped by the hand etc. and can be operated to move in the shifting direction. For example, the shift operation member has multiple shift selecting positions defined in advance and is allowed to be coupled to the connecting/disconnecting member by a movement restriction mechanism only when one of the shift selecting positions and the shift corresponding position of the shift position switching mechanism coincide with each other; however, the movement restriction mechanism may not necessarily be provided, and the shift operation member may unconditionally be coupled relatively immovably in the shifting direction to the connecting/disconnecting member operated to move to the manually shifting position. When the shifting direction is the pivot direction around the shift center line and the connecting/disconnecting direction is the center line direction of the shift center line, the multiple shift selecting positions of the shift operation member are defined around the shift center line, and the movement restriction mechanism is made up of an engagement concave portion and an engagement convex portion allowed to fit to each other in the center line direction of the shift center line when the phase around the shift center line corresponding to the shift selecting position of the shift operation member coincides with the phase around the shift center line of the connecting/disconnecting member defined via the coupling member according to the shift corresponding position of the shift position switching mechanism.

EXAMPLE

An example of the present invention will now be described in detail with reference to the drawings. In the following example, the figures are simplified or deformed as needed and portions are not necessarily precisely drawn in terms of dimension ratio, shape, etc.

Figure 7:
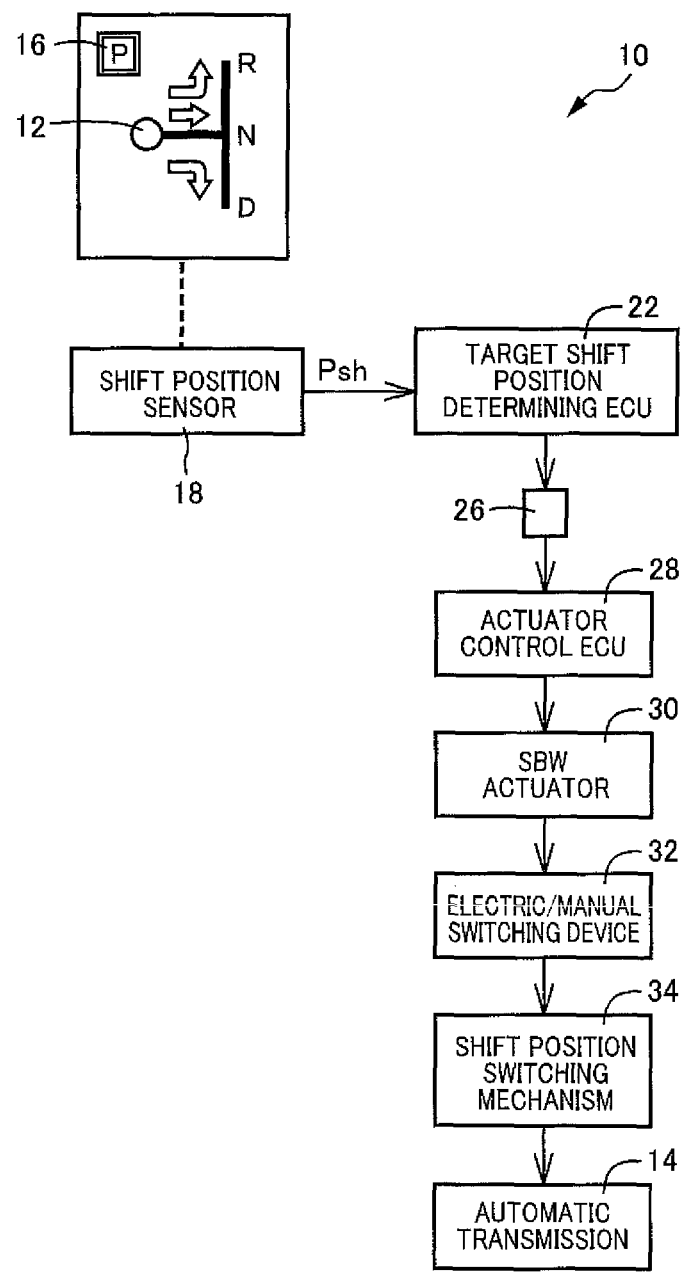
FIG. 7 is a block diagram for explaining a main configuration of the vehicle shift-by-wire device of FIG. 1.

FIG. 1 is a schematic configuration diagram of a vehicle shift-by-wire device 10 according to an example of the present invention, and the device 10 electrically switches a shift position of an automatic transmission 14 in accordance with a shift position selected by a shift lever 12 disposed near a driver's seat and includes various devices shown in a block diagram of FIG. 7. In FIG. 7, the shift lever 12 is operated in accordance with driver's intention to select a shift position and can be operated to move to three positions of "R (reverse)", "N (neutral)", and "D (drive)" to alternatively select three shift positions, i.e., an R position for reverse running of a vehicle, an N position for interrupting power transmission, and a D position for forward running of a vehicle. A push-button P switch 16 pressed at the time of parking is provided separately from the shift lever 12, so that a P position for parking can be selected as a shift position. The shift lever 12 is of a momentary type always automatically returned to a home position shown in FIG. 7 and includes a shift position sensor 18 detecting an operation to each of the operation positions "R", "N", "D", so that a shift position Psh selected by the driver (selected shift position Psh) is electrically detected, including an ON operation of the P switch 16. The shift lever 12 corresponds to a momentary type shift position selecting device.

Figure 2:
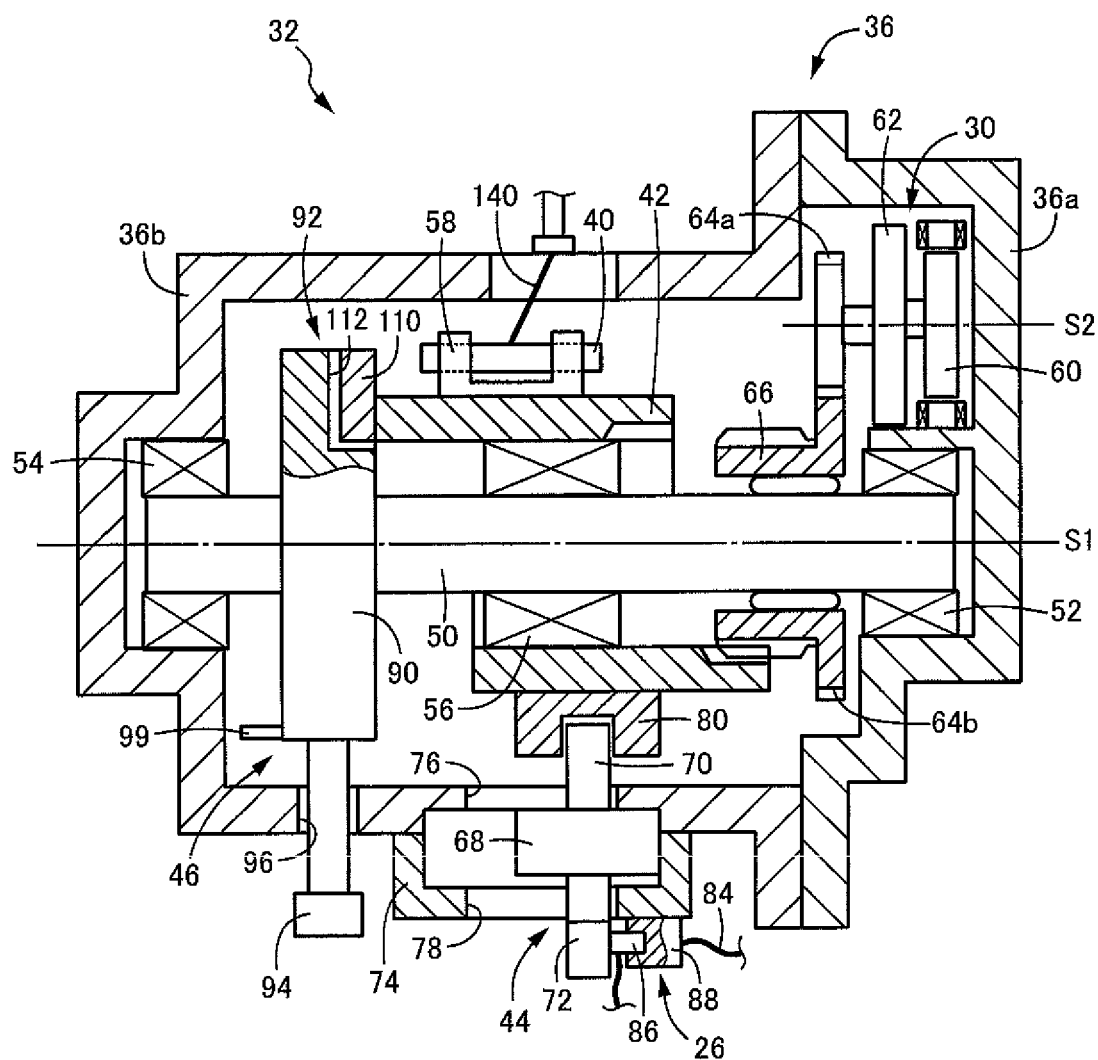
FIG. 2 is a cross-sectional view for specifically explaining an electric/manual switching device of FIG. 1.

A target shift position determining ECU (electronic control device) 22 determines a target shift position of the automatic transmission 14 in consideration of the selected shift position Psh, a vehicle state, etc. The target shift position determining ECU 22 is disposed, for example, on the lower side of an interior panel 24 such as a console near the driver's seat together with the shift position sensor 18. The target shift position determining ECU 22 is connected to an actuator control ECU 28 via an electrical connector device 26, and an SBW (shift-by-wire) actuator 30 is controlled by the actuator control ECU 28 depending on the target shift position so that a shift corresponding position of a shift position switching mechanism 34 is switched and controlled to the target shift position depending on the target shift position via an electric/manual switching device 32 etc. The electric/manual switching device 32 can switch between electric switching for switching the shift position by the SBW actuator 30 and manual switching for switching the shift position by a manual operation, and the SBW actuator 30 is disposed in a casing 36 of the electric/manual switching device 32 as shown in FIG. 2. The SBW actuator 30 corresponds to a shift actuator.

Figure 8:
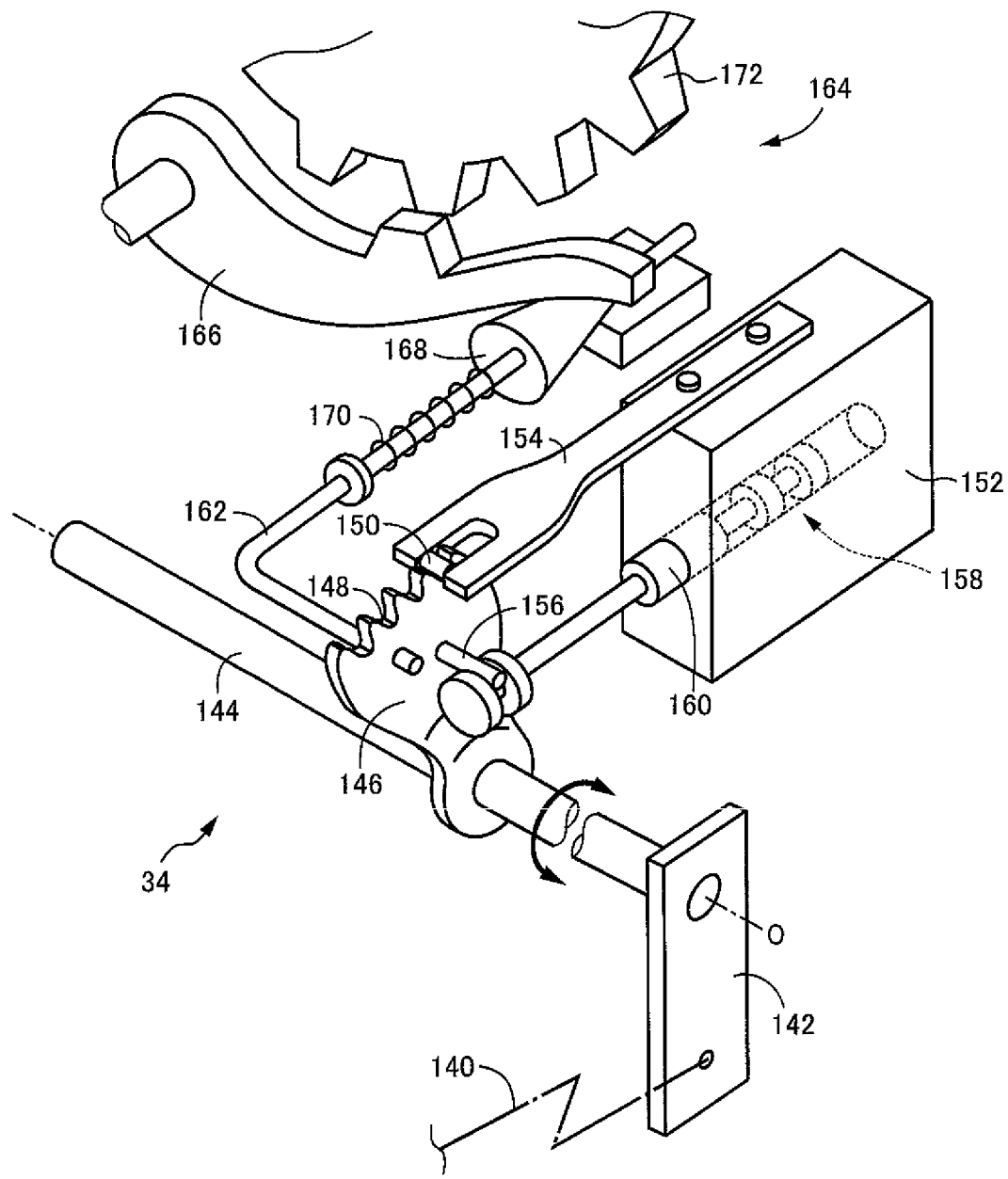
FIG. 8 is a schematic configuration diagram for explaining an example of a shift position switching mechanism of FIG. 7.
Figure 9:
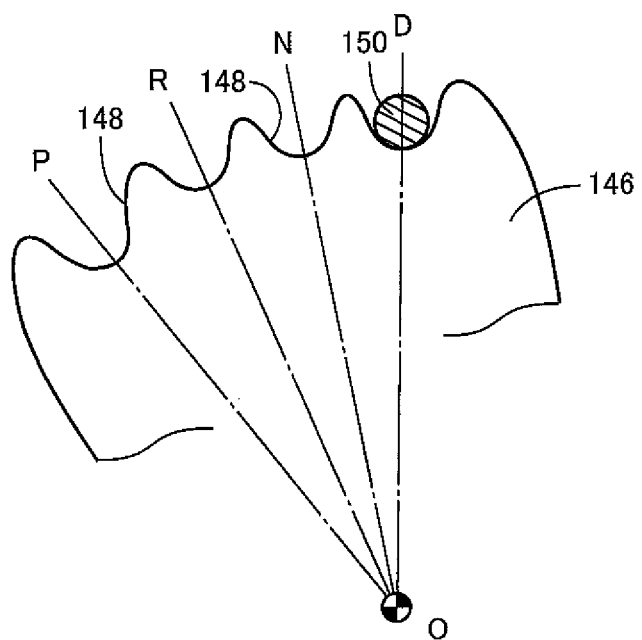
FIG. 9 is a view for explaining a detent plate of the shift position switching mechanism of FIG. 8.

The shift position switching mechanism 34 is configured as shown in FIG. 8, for example. FIG. 8 is a perspective view for explaining a specific example of the shift position switching mechanism 34, and while a main portion of the shift position switching mechanism 34 is housed in a casing of the automatic transmission 14, an outer lever 142 is disposed outside the casing of the automatic transmission 14 and is pivoted by the SBW actuator 30 via a push-pull cable 140 in both forward and reverse directions around a pivot center O. The push-pull cable 140 is an inner cable of a double structure cable in which the inner cable is inserted through an outer cable and is driven in both advancing and retracting directions (push-out and pull-in directions). A manual shaft 144 is integrally fixed to the outer lever 142 concentrically with the pivot center O, and the outer lever 142 is supported pivotally movably around the pivot center O by the manual shaft 144. The manual shaft 144 is disposed in the casing of the automatic transmission 14 except an end portion of the manual shaft 144 to which the outer lever 142 is fixed and has a detent plate 146 for moderation integrally fixed thereto. A tip portion of the detent plate 146 is provided with unevenness having four positioning recesses 148 as shown in FIG. 9, and a positioning roller 150 is engaged with the positioning recesses 148 for positioning the shift position switching mechanism 34 to four shift corresponding positions of the P position, the R position, the N position, and the D position respectively. The positioning roller 150 is disposed rotatably around a support shaft parallel to the pivot center O at a tip portion of a spring plate 154 attached to a valve body 152 of the automatic transmission 14 and applies a predetermined detent force (positioning force) at each of the shift corresponding positions P, R, N, D while being displaced along the uneven shape due to elastic deformation of the spring plate 154.

Figure 10:
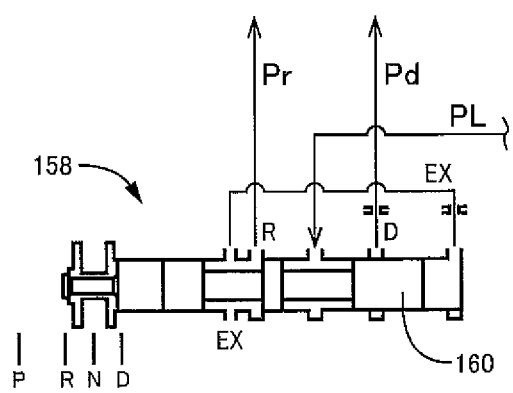
FIG. 10 is a view for explaining an example of a manual valve of an automatic transmission switched by the shift position switching mechanism of FIG. 8.

The detent plate 146 has a coupling pin 156 erected substantially parallel to the pivot center O, while a spool 160 of a manual valve 158 disposed in the valve body 152 is engaged with the coupling pin 156, and the spool 160 is axially moved in accordance with the rotation of the detent plate 146 so that an oil passage is switched depending on the four shift corresponding positions of the P, R, N, and D positions. FIG. 10 shows an example of the manual valve 158, and when the spool 160 is moved to the P position or the N position, output of a line pressure PL is blocked in either case, and the automatic transmission 14 is put into a neutral state (at the P or N position). When the spool 160 is moved to the D position, the line pressure PL is output as a D position pressure Pd from a D port to establish the D position for allowing the forward running, and when the spool 160 is moved to the R position, the line pressure PL is output as an R position pressure Pr from an R port to establish the R position for allowing the reverse running. Therefore, the automatic transmission 14 in the present invention is a planetary gear type transmission in which the four shift positions of the P position, the R position, the N position, and the D position are established according to an engagement/release state of multiple hydraulic engagement devices and is, for example, a forward/reverse switching device simply switching the forward running and the reverse running.

Returning to FIG. 8, an L-shaped parking rod 162 is also coupled to the detent plate 146 relatively rotatably around an axial center of a coupling portion parallel to the pivot center O such that when the detent plate 146 is pivoted to the P position, a mechanical parking lock mechanism 164 is put into a locked state. To the parking rod 162, a tapered member 168 to be engaged with a parking lock pawl 166 is axially movably attached, and a spring 170 for urging the tapered member 168 toward a small diameter end side is disposed. When the detent plate 146 is pivoted to the position P, the parking rod 162 is moved in a direction bringing the tapered member 168 into engagement with the parking lock pawl 166, i.e., in an upper right direction of FIG. 8, and the tapered member 168 is pushed into under the lock pawl 166 in accordance with urging force of the spring 170 so that the lock pawl 166 is pushed upward in FIG. 8 and meshed with a parking gear 172 to thereby non-rotatably lock an output shaft of the automatic transmission 14. Therefore, when the P switch 16 is turned on to select the P position and the detent plate 146 is pivoted to the P position via the push-pull cable 140 etc. by the SBW actuator 30, the manual valve 158 puts the automatic transmission 14 into the neutral state for interrupting the power transmission, and additionally, the mechanical parking lock mechanism 164 is operated to mechanically lock the output shaft.

Figure 3:
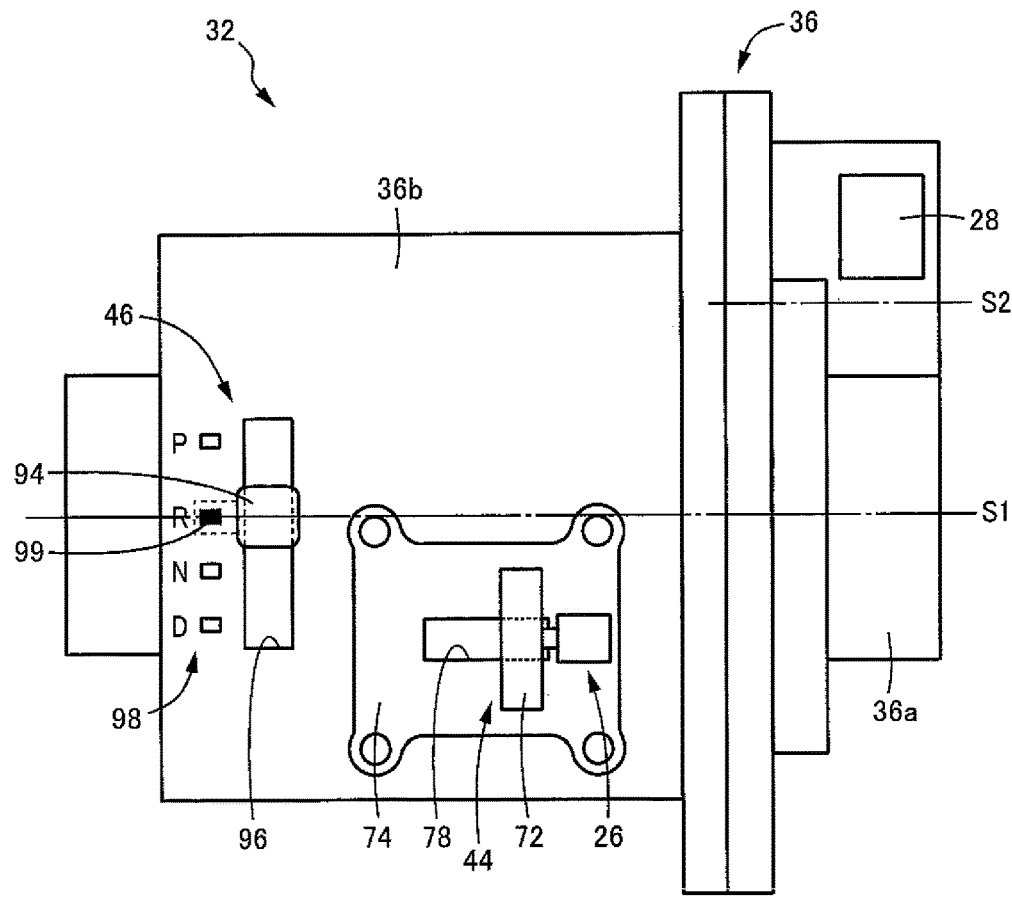
FIG. 3 is a top plan view of the electric/manual switching device of FIG. 1.

The electric/manual switching device 32 coupled to the shift position switching mechanism 34 via the push-pull cable 140 makes the arrangement of the push-pull cable 140 easier, therefore can be disposed at an arbitrary position away from the automatic transmission 14, and is disposed, for example, as shown in FIG. 1, in a lower portion of the interior panel 24 near the driver's seat. The push-pull cable 140 corresponds to an interlocking device mechanically coupled to the shift position switching mechanism 34 to switch the shift corresponding positions. As shown in FIG. 2, the electric/manual switching device 32 includes the casing 36 made up of a first casing member 36a and a second casing member 36b, and the SBW actuator 30 is disposed inside the casing 36 along with a coupling member 40 attached to an end portion of the push-pull cable 140, a cylindrical connecting/disconnecting sleeve 42, a connecting/disconnecting operation member 44, a shift operation member 46, etc. In the casing 36, a shaft 50 is disposed concentrically with a shift center line S1, and the connecting/disconnecting sleeve 42 is concentrically disposed on an outer circumference side of the shaft 50. The shaft 50 is supported by the casing 36 rotatably around the shift center line S1 that is an axial center of the shaft 50 via a pair of bearings 52, 54, and the electric/manual switching device 32 is disposed in the vehicle in a posture in which the shift center line S1 becomes substantially horizontal, for example. FIG. 2 is a cross-sectional view of the electric/manual switching device 32 including the shift center line S1, while FIG. 3 is a plan view of the electric/manual switching device 32, and in the cross-sectional view of FIG. 2, various members each disposed in different positions with respect to the shift center line S1 are shown in one drawing.

Figure 4:
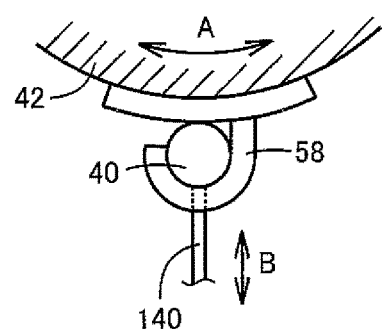
FIG. 4 is a view of a coupling member coupled to a connecting/disconnecting member of FIG. 2 as viewed in a direction parallel to a shift center line S1.

The connecting/disconnecting sleeve 42 corresponds to a connecting/disconnecting member and is supported by the shaft 50 via a bearing 56 etc. relatively movably with respect to the shaft 50 in the center line direction of the shift center line S1 (the left-right direction of FIG. 2) and relatively rotatably around the shift center line S1 with respect to the shaft 50. As shown in FIG. 4, the columnar coupling member 40 is integrally fixed to an outer circumferential portion of the connecting/disconnecting sleeve 42 via a mounting metal fitting 58, and when the connecting/disconnecting sleeve 42 is pivoted around the shift center line S1 that is the axial center as indicated by an arrow A, the push-pull cable 140 is advanced and retracted via the coupling member 40 as indicated by an arrow B, so that the shift corresponding position of the shift position switching mechanism 34 can mechanically be switched via the push-pull cable 140. FIG. 4 is a cross-sectional view when the connecting/disconnecting sleeve 42 is cut orthogonally to the shift center line S1.

The connecting/disconnecting sleeve 42 is also movable to an electrically shifting position shown under the shift center line S1 and a manually shifting position shown above the shift center line S1 in FIG. 2, and when moved to the electrically shifting position, the sleeve 42 is coupled to the SBW actuator 30 and is rotated around the shift center line S1 by the SBW actuator 30. On the other hand, when the sleeve 42 is moved to the manually shifting position, the coupling of the sleeve 42 to the SBW actuator 30 is disconnected, so that the connecting/disconnecting sleeve 42 cannot be pivoted by the SBW actuator 30, i.e., the shift corresponding position of the shift position switching mechanism 34 cannot be switched. The SBW actuator 30 includes an electric motor 60 disposed on a motor center line S2 parallel to the shift center line S1, a speed reducer 62 reducing the rotation speed of the electric motor 60, reduction gears 64a, 64b, and an output member 66 disposed on the shift center line S1 and formed integrally with the reduction gear 64b, and when the connecting/disconnecting sleeve 42 is moved to the electrically shifting position, the connecting/disconnecting sleeve 42 is relatively non-rotatably coupled to the output member 66 via splines etc. As a result, the connecting/disconnecting sleeve 42 can be pivoted by the SBW actuator 30 around the shift center line S1, and a pivot position of the connecting/disconnecting sleeve 42 can be changed depending on the target shift position to switch the shift corresponding position of the shift position switching mechanism 34 via the push-pull cable 140 etc. depending on the target shift position. For the speed reducer 62, for example, a cycloidal speed reducer having an eccentrically-rotated internal planetary gear is used. In this example, the center line direction of the shift center line S1 is the connecting/disconnecting direction, while the pivot direction around the shift center line S1 is the shifting direction, and in the following description, the center line direction of the shift center line S1 is also referred to as the connecting/disconnecting direction, while the pivot direction around the shift center line S1 is also referred to as the shifting direction.

Although the push-pull cable 140 is advanced and retracted also by the movement of the connecting/disconnecting sleeve 42 in the connecting/disconnecting direction, an advancing/retracting amount thereof is smaller as compared to when the connecting/disconnecting sleeve 42 is pivoted around the shift center line S1 to switch the shift corresponding position and can be absorbed by play of the portions such as the push-pull cable 140. If an amount of movement of the connecting/disconnecting sleeve 42 in the connecting/disconnecting direction is relatively large and the advancement and retraction of the push-pull cable 140 due to the movement affect the switching of the shift corresponding position, the coupling member 40 coupled to the push-pull cable 140 may be coupled relatively movably in the connecting/disconnecting direction to the connecting/disconnecting sleeve 42 to limit the movement of the coupling member 40 in the connecting/disconnecting direction by the second casing member 36b etc.

The connecting/disconnecting operation member 44 is disposed in the casing 36 non-rotatably around the shift center line S1 and movably in the center line diction of the shift center line S1 (the connecting/disconnecting direction) and is engaged with the connecting/disconnecting sleeve 42 relatively immovably in the connecting/disconnecting direction, so that the connecting/disconnecting sleeve 42 can manually be operated to move in the connecting/disconnecting direction by using the connecting/disconnecting operation member 44. The connecting/disconnecting operation member 44 includes a sliding portion 68 as well as an engagement projection portion 70 and an operation portion 72 projected to both sides of the sliding portion 68, and the sliding portion 68 is held slidably in the connecting/disconnecting direction between a holding cover 74 integrally fixed on the outside of the second casing member 36b and the second casing member 36b. The second casing member 36b and the holding cover 74 have long holes 76, 78 disposed parallel to the shift center line S1 through which the engagement projection portion 70 and the operation portion 72 are respectively inserted, so that the connecting/disconnecting operation member 44 can be moved in the connecting/disconnecting direction. The engagement projection portion 70 projected from the long hole 76 into the casing 36 is fitted into an engagement groove of an engagement member 80 provided on an outer circumferential surface of the connecting/disconnecting sleeve 42 and is engaged with the engagement member 80 relatively immovably in the connecting/disconnecting direction. The engagement groove of the engagement member 80 is disposed in a circumferential direction of the connecting/disconnecting sleeve 42, and the connecting/disconnecting sleeve 42 can be pivoted in the shifting direction around the shift center line S1 while an engagement state between the engagement member 80 and the engagement projection portion 70 is maintained. The operation portion 72 projects from the long hole 78 to the outside of the holding cover 74, and by gripping the operation portion 72 and moving the connecting/disconnecting operation member 44 in the connecting/disconnecting direction, the connecting/disconnecting sleeve 42 can be operated to move to the electrically shifting position and the manually shifting position regardless of the pivot position (target shift position) thereof. A detent mechanism such as a lock ball mechanism may be disposed between the connecting/disconnecting operation member 44 and the holding cover 74 to apply a detent force (positioning force) at the electrically shifting position and the manually shifting position.

The electrical connector device 26 is disposed across the operation portion 72 of the connecting/disconnecting operation member 44 and the holding cover 74. The electrical connector device 26 is a device enabling or disabling the operation of the SBW actuator 30 and mechanically connects or disconnects an electrical connection cable 84 supplying a control signal of the target shift position determining ECU 22 to the actuator control ECU 28 in this example. The electrical connector device 26 includes a male connector 86 attached to the operation portion 72 and a female connector 88 attached to the holding cover 74, and when the connecting/disconnecting operation member 44 is operated to move the connecting/disconnecting sleeve 42 to the electrically shifting position, the male connector 86 and the female connector 88 are mechanically connected to put the electrical connection cable 84 into a connected state, so that the control signal can be supplied from the target shift position determining ECU 22 to the actuator control ECU 28 to operate the SBW actuator 30 depending on the target shift position. On the other hand, when the connecting/disconnecting operation member 44 is operated to move the connecting/disconnecting sleeve 42 from the electrically shifting position to the manually shifting position, the male connector 86 is separated and mechanically detached from the female connector 88 to put the electrical connection cable 84 into a disconnected state. As a result, the supply of the control signal from the target shift position determining ECU 22 to the actuator control ECU 28 is interrupted, and the operation of the SBW actuator 30 is disabled.

When the connecting/disconnecting sleeve 42 is operated to move to the manually shifting position by the connecting/disconnecting operation member 44, in addition to the disconnection of the electrical connection cable 84 by the electrical connector device 26, the coupling between the connecting/disconnecting sleeve 42 and the output member 66 of the SBW actuator 30 is also disconnected as shown on the upper side from the shift center line S1 in FIG. 2. As a result, the connecting/disconnecting sleeve 42 can arbitrarily be pivoted around the shift center line S1 without being constrained by a pivot position of the output member 66 of the SBW actuator 30, so that the connecting/disconnecting sleeve 42 can be pivoted around the shift center line S1 by a manual operation with the shift operation member 46 to switch the shift corresponding position of the shift position switching mechanism 34. The shift operation member 46 includes a circular plate portion 90 integrally fixed to the shaft 50 or integrally formed with the shaft 50, is supported by the casing 36 via the shaft 50 immovably in the center line direction of the shift center line S1 and rotatably around the shift center line S1, and can be engaged with the connecting/disconnecting sleeve 42 via a movement restriction mechanism 92 relatively non-rotatably in the shifting direction, i.e., around the shift center line S1.

An operation portion 94 is attached to the circular plate portion 90 of the shift operation member 46 to extend out to an outer circumferential side of the circular plate portion 90, and this operation portion 94 is projected to the outside of the casing 36 from a long hole 96 formed in the second casing member 36b. The long hole 96 is formed in the circumferential direction around the shift center line S1, and by gripping the operation portion 94 projected outward from the long hole 96 and pivoting the shift operation member 46 around the shift center line S1, the connecting/disconnecting sleeve 42 can be pivoted around the shift center line S1 to change the pivotal position of the shift operation member 46, and the shift corresponding position of the shift position switching mechanism 34 can manually be switched via the push-pull cable 140. A selected position indicator 98 indicative of four shift selecting positions P, R, N, D is disposed in advance near the long hole 96, and the shift corresponding position of the shift position switching mechanism 34 can be switched in accordance with the shift selecting position by operating the shift operation member 46 to pivot while visually confirming the selected position indicator 98. The selected position indicator 98 is a non-electric indication disposed on an outer circumferential surface of the second casing member 36b as an engraved mark, a display plate, etc., and in this example, openings are formed in addition to letters P, R, N, and D, so that a colored plate 99 pivoted integrally with the operation portion 94 can visually be confirmed from the outside. Only the letters P, R, N and D may be used without including the openings and the colored plate 99. The selected position indicator 98 can be disposed on the operation portion 94 of the shift operation member 46. FIG. 3 shows a state in which the shift operation member 46 is operated to the shift selecting position of R. The shift operation member 46 and the connecting/disconnecting operation member 44 are disposed on an upper surface side of the casing 36 as shown in FIG. 3, for example, and making a portion of the interior panel 24 openable and closable allows the driver (or a worker) to easily operate the connecting/disconnecting operation member 44 and the shift operation member 46 to manually switch the automatic transmission 14 to the desired shift position at the time of failure when the shift position cannot electrically be switched by the SBW actuator 30 due to a dead battery, breaking of wire, a short circuit, etc. The interior panel 24 is provided with an opening/closing lid 24a etc. for operation at the time of failure.

Figure 6:
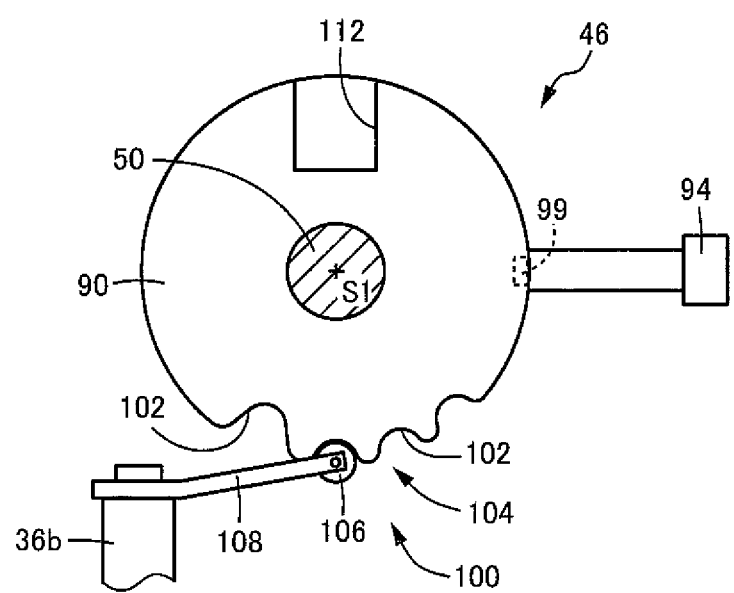
FIG. 6 is a view for explaining an engagement concave portion and a detent mechanism disposed in a shift operation member of FIG. 2.

To the shift operation member 46, a predetermined detent force (positioning force) is applied at the four shift selecting positions P, R, N, D by a detent mechanism 100 shown in FIG. 6. The detent mechanism 100 includes an uneven portion 104 having four positioning recesses 102 disposed on an outer circumferential portion of the circular plate portion 90 and a positioning roller 106 engaged with one of the positioning recesses 102, and the positioning roller 106 is engaged with the one of the four positioning recesses 102 and thereby the shift operation member 46 is positioned at one of the four shift selecting positions P, R, N, D. The positioning roller 106 is disposed rotatably around a support shaft parallel to the shift center line S1 at a tip portion of a spring plate 108 attached to the second casing member 36b and applies a predetermined detent force at each of the shift selecting positions P, R, N, D while being displaced along the uneven portion 104 due to elastic deformation of the spring plate 108. The uneven portion 104 may be disposed on the second casing member 36b side, and the spring plate 108 and the positioning roller 106 may be disposed on the shift operation member 46 side.

The movement restriction mechanism 92 is a mechanism for allowing the connecting/disconnecting sleeve 42 to be operated to move toward the manually shifting position and coupled to the shift operation member 46 relatively non-pivotally around the shift center line S1 only when the shift selecting position of the shift operation member 46 coincides with the shift corresponding position of the shift position switching mechanism 34 and for preventing the coupling between the connecting/disconnecting sleeve 42 and the shift operation member 46 when the shift selecting position of the shift operation member 46 does not coincide with the shift corresponding position of the shift position switching mechanism 34. Specifically, since the connecting/disconnecting sleeve 42 is coupled to the shift position switching mechanism 34 via the coupling member 40 and the push-pull cable 140, the pivot position of the connecting/ disconnecting sleeve 42 around the shift center line S1 corresponds to the shift corresponding position of the shift position switching mechanism 34. Therefore, since the connecting/disconnecting sleeve 42 and the shift operation member 46 can be coupled only when the shift corresponding position coincides with the shift selecting position of the shift operation member 46, the shift operation member 46 can be operated in accordance with the selected position indicator 98 to thereby switch the shift corresponding position of the shift position switching mechanism 34 based on an indication of the shift selecting position of the selected position indicator 98, and the automatic transmission 14 can be switched to a desired shift position.

Figure 5A:
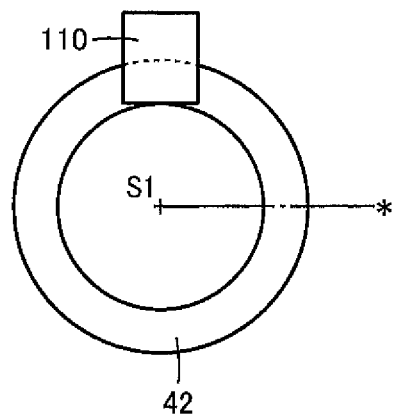
FIG. 5A is a view for explaining an engagement member disposed at an end portion of the connecting/disconnecting member of FIG. 2.
Figure 5B:
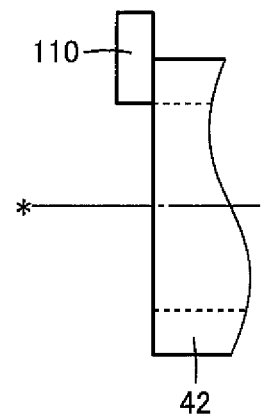
FIG. 5B is a view for explaining an engagement member disposed at an end portion of the connecting/disconnecting member of FIG. 2.

The movement restriction mechanism 92 is configured to include a rectangular engagement convex portion 110 integrally fixed to one end surface of the connecting/disconnecting sleeve 42, i.e., an end surface on the manually shifting position side, on an outer circumferential side away from the shift center line S1, as shown in FIGS. 5A and 5B, for example, and a rectangular engagement concave portion 112 formed on an outer circumferential side of an end surface of the circular plate portion 90 as shown in FIG. 6 such that the engagement convex portion 110 can be fitted thereto. FIGS. 5A and 5B are an end view and a side view, respectively, of the connecting/disconnecting sleeve 42, and FIG. 6 is an end view of the circular plate portion 90. The engagement convex portion 110 and the engagement concave portion 112 are disposed such that when the shift selecting position of the shift operation member 46 coincides with the shift corresponding position of the shift position switching mechanism 34, phases of the shift operation member 46 and the shift position switching mechanism 34 around the shift center line S1 coincide each other and thus the portions 46, 34 can be fitted with each other and then, are engaged relatively non-rotatably around the shift center line S1. If the shift corresponding position of the shift position switching mechanism 34 is unknown, the shift operation member 46 can be pivoted and operated in the shifting direction to move the connecting/disconnecting sleeve 42 toward the manually shifting position by the connecting/disconnecting operation member 44 while changing the shift selecting position, and the connecting/disconnecting sleeve 42 can thereby be moved to the manually shifting position and coupled to the shift operation member 46 when the shift selecting position coincides with the shift corresponding position of the shift position switching mechanism 34.

In the vehicle shift-by-wire device 10 as described above, during a normal time when the SBW actuator 30 is normally operated, the connecting/disconnecting sleeve 42 is held at the electrically shifting position, and the electrical connector device 26 is put into the connected state. As a result, the target shift position of the automatic transmission 14 is set by the target shift position determining ECU 22 based on the selected shift position Psh selected with the shift lever 12 and the P switch 16 operated by the driver, the vehicle state, etc., and the SBW actuator 30 is operated depending on the target shift position, so that the shift position switching mechanism 34 is switched to the shift corresponding position corresponding to the target shift position via the electric/manual switching device 32, the push-pull cable 140, etc. The spool 160 of the manual valve 158 is moved in the axial direction depending on the shift corresponding position of the shift position switching mechanism 34, i.e., the pivot position of the detent plate 146, and the mechanical parking lock mechanism 164 is operated at the P position, so that the automatic transmission 14 is electrically switched to the target shift position.

On the other hand, at the time of the failure when the shift position cannot electrically be switched by the SBW actuator 30 due to a dead battery, breaking of wire, a short circuit, etc., the driver (or operator) can open the opening/closing lid 24a etc. disposed on the interior panel 24 and operate the electric/manual switching device 32 to manually switch the shift corresponding position of the shift position switching mechanism 34 and further the shift position of the automatic transmission 14. Specifically, when the connecting/disconnecting sleeve 42 is moved from the electrically shifting position toward the manually shifting position by the operation portion 94 of the connecting/disconnecting operation member 44 gripped and operated by the driver, the coupling between the connecting/disconnecting sleeve 42 and the SBW actuator 30 is mechanically disconnected, and the electrical connector device 26 is put into the disconnected state so that energization between the target shift position determining ECU 22 and the actuator control ECU 28 is interrupted, which makes the SBW actuator 30 inoperable. This prevents the SBW actuator 30 from suddenly starting to rotate in the case of natural failure recovery.

If the shift selecting position of the shift operation member 46 coincides with the shift corresponding position of the shift position switching mechanism 34 when the connecting/disconnecting sleeve 42 is moved toward the manually shifting position, the connecting/disconnecting sleeve 42 can directly be moved to the manually shifting position regardless of the presence of the movement restriction mechanism 92 and can be coupled to the shift operation member 46 relatively non-pivotally in the shifting direction. In this example, the engagement convex portion 110 of the movement restriction mechanism 92 is fitted to and thereby engaged with the engagement concave portion 112 relatively non-pivotally in the shifting direction, and by rotating the shift operation member 46 in this state to the desired shift selecting position while the driver (or operator) confirms the selected position indicator 98, the shift position switching mechanism 34 can be switched to the shift corresponding position corresponding to the shift selecting position. The automatic transmission 14 is switched to the corresponding shift position depending on the shift corresponding position, which enables the vehicle to run even at the time of the failure.

If the shift selecting position of the shift operation member 46 does not coincide with the shift corresponding position of the shift position switching mechanism 34 when the connecting/disconnecting sleeve 42 is moved toward the manually shifting position, the movement restriction mechanism 92 prevents the coupling between the connecting/disconnecting sleeve 42 and the shift operation member 46. If the shift corresponding position can be confirmed with reference to the outer lever 142 etc. of the shift position switching mechanism 34 disposed in the automatic transmission 14, the shift operation member 46 can be pivoted and operated to the shift selecting position corresponding to the shift corresponding position to move the connecting/disconnecting sleeve 42 to the manually shifting position for coupling to the shift operation member 46. Since the momentary type shift lever 12 is used in this example, the shift corresponding position of the shift position switching mechanism 34 cannot be judged from the position of the shift lever 12. If the shift corresponding position of the shift position switching mechanism 34 is unknown, the connecting/disconnecting sleeve 42 can be moved toward the manually shifting position by the connecting/disconnecting operation member 44 while the shift operation member 46 is operated to pivot in the shifting direction to change the shift selecting position so that the connecting/disconnecting sleeve 42 is moved to the manually shifting position and coupled to the shift operation member 46 when the shift selecting position coincides with the shift corresponding position of the shift position switching mechanism 34. Subsequently, by rotating the shift operation member 46 to the desired shift selecting position while the driver (operator) confirms the selected position indicator 98, the shift position switching mechanism 34 can be switched to the shift corresponding position corresponding to the shift selecting position, which enables the vehicle to run.

As described above, in the vehicle shift-by-wire device 10 of this example, the shift corresponding position of the shift position switching mechanism 34 can be switched by the SBW actuator 30 while the connecting/disconnecting sleeve 42 is held at the electrically shifting position, and when the connecting/disconnecting sleeve 42 is moved to the manually shifting position, the coupling with the connecting/disconnecting sleeve 42 to the SBW actuator 30 is disconnected, and the shift corresponding position of the shift position switching mechanism 34 cannot be switched by the SBW actuator 30. Therefore, at the time of failure when the switching by the SBW actuator 30 cannot be performed, the shift corresponding position of the shift position switching mechanism 34 can manually be switched by pivoting the connecting/disconnecting sleeve 42 in the shifting direction through the movement operation to the manually shifting position. In this case, since the coupling between the SBW actuator 30 and the connecting/disconnecting sleeve 42 is disconnected at the manually shifting position, even if the SBW actuator 30 resumes operation in the case of natural recovery from the failure state, the connecting/disconnecting sleeve 42 does not pivot so that the shift position switching mechanism 34 is prevented from switching to the unintended shift corresponding position. Particularly, in this example, when the connecting/disconnecting sleeve 42 is moved to the manually shifting position by the connecting/disconnecting operation member 44, the electrical connector device 26 is put into the disconnected state, and the energization is interrupted between the target shift position determining ECU 22 and the actuator control ECU 28, so that the SBW actuator 30 is maintained in an operation stop state even after recovery from the failure state, and the connecting/disconnecting sleeve 42 is more reliably prevented from pivoting (moving in the shifting direction).

The shift-by-wire device 10 includes the shift operation member 46 coupled to the connecting/disconnecting sleeve 42 and is provided with the movement restriction mechanism 92 allowing the connecting/disconnecting sleeve 42 to be operated to move to the manually shifting position and coupled to the shift operation member 46 only when the shift selecting position of the shift operation member 46 coincides with the shift corresponding position of the shift position switching mechanism 34, and therefore, at the manually shifting position, the shift operation member 46 can be pivoted and operated to a desired shift selecting position to appropriately switch the shift position switching mechanism 34 to the shift corresponding position corresponding to the shift selecting position.

When the shift selecting position of the shift operation member 46 does not coincide with the shift corresponding position of the shift position switching mechanism 34, and the shift corresponding position of the shift position switching mechanism 34 is unknown, the shift selecting position coinciding with the shift corresponding position of the shift position switching mechanism 34 can be obtained by moving and operating the shift operation member 46 in the shifting direction to move the connecting/disconnecting sleeve 42 toward the manually shifting position while changing the shift selecting position, so that the connecting/disconnecting sleeve 42 can be moved to the manually shifting position and coupled to the shift operation member 46.

Since the movement restriction mechanism 92 is made up of the engagement convex portion 110 disposed in the connecting/disconnecting sleeve 42 and the engagement concave portion 112 disposed in the shift operation member 46, if the shift selecting position of the shift operation member 46 does not coincide with the shift corresponding position of the shift position switching mechanism 34, the engagement convex portion 110 and the engagement concave portion 112 cannot be fitted to each other, and therefore, the movement of the connecting/disconnecting sleeve 42 is prevented so that the coupling of the shift position switching mechanism 34 to the shift operation member 46 is reliably prevented. When the engagement convex portion 110 and the engagement concave portion 112 are in the identical phase and fitted to each other, the shift operation member 46 and the connecting/disconnecting sleeve 42 are coupled via the engagement convex portion 110 and the engagement concave portion 112 relatively non-pivotally in the shifting direction, and therefore, the connecting/disconnecting sleeve 42 can be pivoted via the engagement convex portion 110 and the engagement concave portion 112 together with the shift operation member 46 in the shifting direction, so that the device 10 is easily and inexpensively manufactured.

Since the device 10 has the detent mechanism 100 positioning the shift operation member 46 at each of the multiple shift selecting positions and is provided with the selected position indicator 98 indicating selected one of the multiple shift position select positions, the shift corresponding position of the shift position switching mechanism 34 can easily and appropriately be switched by using the shift operation member 46 while the driver (or operator) confirms the shift selecting position with the selected position indication 98.

Since the momentary type shift lever 12 automatically returns to the home position after the selection operation of the shift position is used, the selected shift position Psh at the time of occurrence of failure is not identified from the shift lever 12, and if the shift position Psh is different from the shift corresponding position selected by manually pivoting the connecting/disconnecting sleeve 42 in the shifting direction at the time of failure, the SBW actuator 30 may perform switching to the unintended shift corresponding position (the selected shift position at the time of occurrence of failure) at the time of recovery from the failure. In this regard, since the connecting/disconnecting sleeve 42 is detached from the SBW actuator 30 in this example, the connecting/disconnecting sleeve 42 is not pivoted in the shifting direction even after recovery from the failure, and the shift corresponding position selected by the pivoting operation of the connecting/disconnecting sleeve 42 is maintained even if the shift corresponding position is different from the selected shift position Psh at the time of occurrence of failure.

Since the shifting direction is the pivot direction around the shift center line S1 and the connecting/disconnecting direction is the center line direction of the shift center line S1, the cylindrical connecting/disconnecting sleeve 42 disposed concentrically with the shift center line S1 can be used as the connecting/disconnecting member, so that the connecting/disconnecting operation and the shift operation can easily be performed, and the electric/manual switching device 32 mainly composed of the connecting/disconnecting sleeve 42 can easily and inexpensively be manufactured.

Although the example of the present invention has been described in detail with reference to the drawings, this is merely an embodiment, and the present invention can be implemented in variously modified and improved forms based on the knowledge of those skilled in the art.

REFERENCE SIGNS LIST

10: Vehicle shift-by-wire device 12: Shift lever (Shift position selecting device) 14: Automatic transmission 26: Electrical connector device 30: SBW actuator (Shift actuator) 32: Electric/manual switching device 34: Shift position switching mechanism 36: Casing 40: Coupling member 42: Connecting/disconnecting sleeve (Connecting/disconnecting member) 44: Connecting/disconnecting operation member 46: Shift operation member 66: Output member 84: Electrical connection cable 92: Movement restriction mechanism 98: Selected position indicator 100: Detent mechanism 110: Engagement convex portion (Engagement convex portion) 112: Engagement concave portion 140: Push-pull cable (Interlocking device) S1: Shift center line

What is claimed is:

1. A vehicle shift-by-wire device including an automatic transmission, a shift position switching mechanism configured to switch a shift position of the automatic transmission in accordance with a plurality of shift corresponding positions of the shift position switching mechanism and a shift actuator configured to electrically drive the shift position switching mechanism, the vehicle shift-by-wire device further comprising:
    a casing in which the shift actuator is disposed;
    a coupling member mechanically coupled to the shift position switching mechanism via an interlocking device and moved in a shifting direction to switch the shift corresponding position of the shift position switching mechanism; and
    a connecting/disconnecting member disposed in the casing so as to be movable in the shifting direction and in a connecting/disconnecting direction crossing the shifting direction, and configured to be integrally moved in the shifting direction with the coupling member, wherein:
        when the connecting/disconnecting member is held at an electrically shifting position in the connecting/disconnecting direction, the connecting/disconnecting member is coupled to the shift actuator and is moved in the shifting direction by the shift actuator to switch the shift corresponding position of the shift position switching mechanism via the coupling member, and
        when the connecting/disconnecting member is moved to a manually shifting position in the connecting/disconnecting direction, the connecting/disconnecting member coupled to the shift actuator is disconnected so that the shift actuator is disabled to switch the shift corresponding position of the shift position switching mechanism.

2. The vehicle shift-by-wire device according to claim 1, further comprising:
    a shift operation member disposed in the casing so as to be movable in the shifting direction such that when the connecting/disconnecting member is moved to the manually shifting position, the shift operation member is coupled to the connecting/disconnecting member, and manually operated to move to one of a plurality of predetermined shift selecting positions so that the connecting/disconnecting member is moved in the shifting direction and the shift corresponding position of the shift position switching mechanism is switched via the coupling member; and
    a movement restriction mechanism disposed in at least one of the shift operation member and the connecting/disconnecting member, the movement restriction mechanism being configured to allow the connecting/disconnecting member of which the position in the shifting direction is defined in accordance with the shift corresponding position via the coupling member to be operated to move in the manually shifting direction and to couple the shift operation member only when the shift selecting position of the shift operation member coincides with the shift corresponding position of the shift position switching mechanism.

3. The vehicle shift-by-wire device according to claim 2, wherein the movement restriction mechanism includes an engagement concave portion and an engagement convex portion (i) disposed in one and the other of the shift operation member and the connecting/disconnecting member, (ii) allowed to fit to each other in the connecting/disconnecting direction, and (iii) allowed to be engaged relatively immovably in the shifting direction when the shift selecting position of the shift operation member coincides with the shift corresponding position of the shift position switching mechanism.

4. The vehicle shift-by-wire device according to claim 2, further comprising:
    a selected position indicator indicating shift selecting positions and disposed in at least one of the casing and the shift operation member; and
    a detent mechanism positioning the shift operation member at each of the plurality of shift selecting positions.

5. The vehicle shift-by-wire device according to claim 1, further comprising:
    a connecting/disconnecting operation member disposed in the casing immovably in the shifting direction and movably in the connecting/disconnecting direction, the connecting/disconnecting operation member being configured to engage the connecting/disconnecting member relatively immovably in the connecting/disconnecting direction to operate the connecting/disconnecting member manually to move in the connecting/disconnecting direction; and
    an electrical connector device disposed across the connecting/disconnecting operation member and the casing, the electrical connector device being configured to mechanically connect and disconnect an electrical connection cable such that (i) the electrical connector device is put into a connected state to enable the shift actuator to operate when the connecting/disconnecting operation member is operated to move, (ii) the connecting/disconnecting member is moved to the electrically shifting position, (iii) the electrical connector device is put into a disconnected state to make the shift actuator unable to operate when the connecting/disconnecting operation member is operated to move, and (iv) the connecting/disconnecting member is moved to the manually shifting position.

6. The vehicle shift-by-wire device according to claim 1, further comprising a momentary type shift position selecting device configured to be operated by a driver to alternatively select one of a plurality of shift positions of the automatic transmission and to return automatically to an original state after a selecting operation of the shift position is performed.

7. The vehicle shift-by-wire device according to claim 1, wherein:
- the connecting/disconnecting member is configured to move pivotally around a shift center line that is the shifting direction and movably in a direction of the shift center line that is the connecting/disconnecting direction,
- the connecting/disconnecting member is coupled relatively non-pivotally to an output member of the shift actuator disposed on the shift center line when the connecting/disconnecting member is operated to move to the electrically shifting position in the shift center line direction, and
- the connecting/disconnecting member coupled to the output member is disconnected from the output member when the connecting/disconnecting member is operated to move to the manually shifting position in the center line direction.

\* \* \* \* \*